United States Patent
Badaye et al.

(10) Patent No.: US 8,125,469 B2
(45) Date of Patent: Feb. 28, 2012

(54) PASSIVE STYLUS FOR CAPACITIVE SENSORS

(75) Inventors: Massoud Badaye, Santa Clara, CA (US); Richard R. Schediwy, Union City, CA (US)

(73) Assignee: Synaptics, Inc., Santa Clara, CA (US)

( * ) Notice: Subject to any disclaimer, the term of this patent is extended or adjusted under 35 U.S.C. 154(b) by 985 days.

(21) Appl. No.: 12/106,200

(22) Filed: Apr. 18, 2008

(65) Prior Publication Data
US 2009/0262637 A1 Oct. 22, 2009

(51) Int. Cl.
*G06F 3/033* (2006.01)
(52) U.S. Cl. .......... 345/179; 178/18.01; 178/19.03; 178/19.04; 369/126
(58) Field of Classification Search .......... 345/179; 178/18.01, 19.03, 19.04; 369/126
See application file for complete search history.

(56) References Cited

U.S. PATENT DOCUMENTS

| | | | |
|---|---|---|---|
| 5,440,080 A | | 8/1995 | Nagaoka et al. |
| 5,877,459 A | * | 3/1999 | Prater .......... 178/19.06 |
| 5,914,708 A | * | 6/1999 | LaGrange et al. .......... 345/179 |

FOREIGN PATENT DOCUMENTS

| JP | 309090 | 11/1994 |
|---|---|---|
| JP | 2000-122799 | 4/2000 |

OTHER PUBLICATIONS

Songtak Technologies, "Capacitive stylus for iPhone and iPod Touch", www.songtak.com.tw/product.php?mode=show&cid=3&pid=173, 2 pages.
Ten One Design, "Introducing the Pogo Stylus", www.tenonedesign.com/stylus.php, 7 pages.
Igiki Network, "TapRight—A Stylus for the iPhone (or iPod touch)", http://tapright.com/iPhone_Stylus.html, iGiki Network,(2007),1-5.

* cited by examiner

*Primary Examiner* — Richard Hjerpe
*Assistant Examiner* — Sahlu Okebato

(57) ABSTRACT

A passive stylus for capacitive sensors comprises a tip and a shaft. The tip is configured to couple electrically with a capacitive sensing device and to couple physically and electrically with the stylus shaft. The tip comprises a contact surface, a support region, and a flexible region. The contact surface is configured to contact a device surface associated with the capacitive sensing device. The flexible region is disposed between the contact surface and the support region. The flexible region comprises a hardness gradient. The support region is configured to provide structural support to the flexible region.

25 Claims, 12 Drawing Sheets

PASSIVE STYLUS FOR CAPACITIVE SENSORS

TECHNICAL FIELD

Embodiments of the present technology relate generally to the field of capacitive sensors.

BACKGROUND

Recently, there has been a high demand for capacitive sensor devices, which typically sense finger input to support stylus-based handwriting and sketching input. This is especially the case in the gaming, cell phone, and personal digital assistant industries, with devices capable of running applications as drawing or character recognition applications. The capacitive sensing devices used in these industries may be activated by a finger, a stylus, or other input object means. In most cases, the input object means are conductive means.

Some mobile devices using capacitive touch sensors have user interfaces that jam a large number of soft buttons and icons in a small input area. Given the size of a human finger, it may be difficult to activate one button in such user interfaces without accidentally activating a neighboring button or icon. For a touch screen interface, the use of a software magnifier that zooms in on the area of potential input by the user somewhat helps alleviate this problem, but this approach uses up valuable screen space, runs the risk of zooming in on wrong input options, and may confuse or annoy users. One alternative in these situations is to use a pen (also "stylus") that has a tip smaller than that of a finger tip to activate the button or icon.

Some applications using capacitive sensing devices allow for stylus-based handwriting and sketching. When using applications for handwriting and sketching, the size of a stylus tip, the stylus' electrical conductivity and the stylus tip's ability to properly track a user's intended input are important factors for performance. The tip size determines the footprint of the stylus on the touch interface. If the tip is too small, the footprint is not sufficiently large to provide enough capacitive coupling between the conductive tip and the sensor elements. If the stylus is non-conductive or partially conductive, it may not provide sufficient signal to the desired sensor elements. The user may become frustrated by having to repeat the input. Also, if the tip is too large, leaving a large footprint, writing becomes awkward and unnatural. Furthermore, if the stylus tip trails behind the user's intended motion, the stylus may feel unresponsive to the user.

SUMMARY

Systems and methods for a passive stylus for capacitive sensors are discussed herein. The stylus comprises a tip and a shaft. The tip is configured to couple electrically with a capacitive sensing device and to couple physically and electrically with the stylus shaft. The tip comprises a contact surface, a support region, and a flexible region. The contact surface is configured to contact a device surface associated with the capacitive sensing device. The flexible region is disposed between the contact surface and the support region. The flexible region comprises a hardness gradient. The support region is configured to provide structural support to the flexible region.

BRIEF DESCRIPTION OF THE DRAWINGS

The accompanying drawings, which are incorporated in and form a part of this specification, illustrate embodiments of the presented technology and, together with the description, serve to explain the principles of the presented technology.

The drawings referred to in this description should not be understood as being drawn to scale unless specifically noted.

DETAILED DESCRIPTION

Reference will now be made in detail to the alternative embodiments of the present technology. While numerous specific embodiments of the present technology will be described in conjunction with the alternative embodiments, it will be understood that they are not intended to limit the present technology to these embodiments. On the contrary, these described embodiments of the present technology are intended to cover alternatives, modifications and equivalents, which may be included within the spirit and scope of the embodiments as defined by the appended claims.

Furthermore, in the following detailed description, numerous specific details are set forth in order to provide a thorough understanding of the present technology. However, it will be recognized by one of ordinary skill in the art that embodiments may be practiced without these specific details. In other instances, well known methods, procedures, components, and circuits have not been described in detail as not to unnecessarily obscure aspects of embodiments of the present technology.

In various embodiments, a writing device configured to enable electrical coupling between a capacitive sensing device and a user is discussed. The writing device comprises a pliable contact surface, a longitudinal support, and a cushioning member. The pliable contact surface is configured to provide reduced sliding friction when the writing device is used to write on a device surface associated with the capacitive sensing device. The cushioning member is disposed between the pliable contact surface and the longitudinal support. The longitudinal support is configured to provide structural support to the cushioning member. The longitudinal support is configured to reduce lateral deformation of the cushioning member responsive to a force exerted on the surface of the capacitive sensing device with the writing device. Although other shapes and configurations are available, oftentimes an axis of the longitudinal support is designed to coincide with the axis of the writing device.

Figure 1:
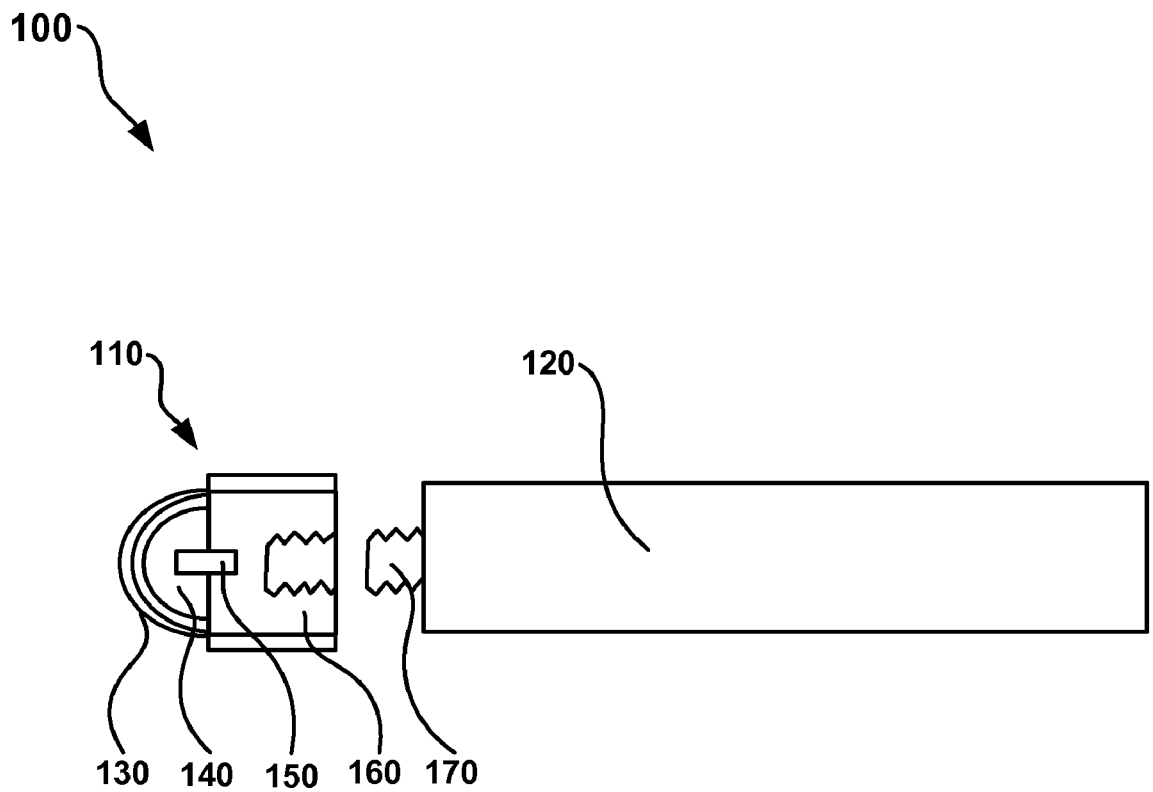
FIG. 1 illustrates a cross-sectional view of a stylus, in accordance with an embodiment of the present technology.

FIG. 1 illustrates a cross-sectional view of a stylus 100, in accordance with an embodiment of the present technology. The stylus comprises a tip 110 and a shaft 120 coupled to each other. The tip 110 comprises a contact surface 130, a flexible region 140, a support region 150, and an attachment mechanism 160. The flexible region 140 is disposed between the contact surface 130 and the support region 150. The shaft 120 comprises an attachment mechanism 170. The shaft 120 is configured to be held and/or used by a user.

The tip 110 and shaft 120 are configured to physically and electrically couple to each other. In some embodiments, the attachment mechanisms 160 and 170 physically couple the tip 110 and the shaft 120. In various embodiments, the shaft 120 is physically and/or electrically coupled to the contact surface 130, the flexible region 140, and the support region 150.

The contact surface 130 is configured to be pliable to provide a soft feeling as the stylus 100 is used. In some embodiments, the contact surface 130 comprises electrically conductive material. The contact surface 130 is configured to physically contact a device surface associated with a capacitive sensing device during at least some part of operation.

In various embodiments, the contact surface 130 comprises a conductive fabric. The conductive fabric may be stretchable and may partially or fully enclose the flexible region 140. The conductive fabric may have a lower friction constant than rubber or other flexible materials on a plastic or glass surface. The conductive fabric in the above embodiments may also reduce the possibilities of leaving a residue after being slid along a plastic or glass surface.

The flexible region 140 is configured to be flexible. Flexibility increases the size of the contact patch to enhance electrical coupling to the sensor. The flexible region 140 may comprise one or more elastomers or other materials. In some embodiments, the flexible region 140 has a hardness gradient, such that the hardness varies in flexible region 140. The gradient may be produced by using different materials, such as two layers of silicone rubber with one layer having a durometer reading of 25-30 shore A, and another layer having a durometer reading of 10-15 shore A. The proper hardness gradient helps minimize undesirable tip distortion and maximize the contact patch while force is being exerted to the tip 110 of stylus 100 during poking, writing, drawing, or other use. In other embodiments, the flexible region 140 does not have a hardness gradient. In various embodiments, the flexible region 140 may help to further cushion the stylus 100.

The flexible region 140 has a hardness gradient. The hardness gradient is configured to provide a user with the ability to exert an appropriate range of force in different directions to generate a desired effect when the tip 110 is applied to a capacitive sensing device. When a user exerts a small force, the flexible region 140 deforms enough to cause sufficient coupling between the tip and a capacitive sensing device. If the user applies a larger force, the flexible region 140 deforms further to provide a larger footprint on the surface that is within a desired range. In various embodiments, the flexible region 140 is configured for a particular range of force applications, estimated as the forces typically experienced by a pen during normal handwriting, to create a properly sized footprint which is large enough to cause measurable signals in at least one sensor electrode. For some touch pads, passive styli with circular footprints having diameters in a range of 2-8 mm have generated satisfactory results.

In various embodiments, the hardness gradient has an overall decreasing hardness in a direction from the support region to the contact surface. The overall hardness gradient is further discussed herein and in FIGS. 5A and 5B. In some embodiments, the hardness gradient is produced using layers having different hardnesses within the flexible region 140, which is further discussed herein and in FIG. 3. In other embodiments, the hardness gradient is produced using gaseous, solid, or regions of other material within the flexible region 140, which is further discussed herein and in FIG. 4.

The support region 150 is configured to provide structural support to the flexible region 140. The structural support may provide appropriate support in response to force applied in various directions. In some embodiments, the support region 150 is a separate component coupled to the shaft 120 during manufacturing. In other embodiments, the support region 150 is manufactured integrally as a part of shaft 120. The support region may be made of a relatively hard material, such as a hard plastic, a ceramic, a metal (such as aluminum), a composite material, and/or other material substantially harder than the main material comprising flexible region 140 that may be used to provide appropriate support. Oftentimes, the support region 150 has a cylindrical shape resembling that of a pin or rod. Dimensions and shapes may vary depending on a desired support and/or material used for the flexible region 140. In some embodiments, the support region 150 has a complex shape. Example support regions are discussed further herein and in FIGS. 7A-7D.

In various embodiments, the support region 150 supports the flexible region 140 so that when the stylus 100 is used at an angle (as it is normally used during sketching or handwriting) the flexible region 140 distorts by a desired amount in response to typical sketching or handwriting forces. In some embodiments, the support region 150 provides longitudinal support to the flexible region 140.

In various embodiments, the contact surface 130, the flexible region 140, and the support region 150 each comprises a physically separate component. These separate components are coupled to each other during manufacture. In other embodiments, one or more of the contact surface 130, the flexible region 140, and the support region 150 comprise parts of the same component. For example, the contact surface 130 may be a surface of flexible region 140. As another example, the flexible region 140 and the support region 150 may be formed together out of the same polymer or elastomer, with the support region 150 comprising a section of the component with higher density than the section of the component forming flexible region 140.

In some embodiments in which the shaft 120 is physically coupled to the contact surface 130, the flexible region 140, and the support region 150, one or both of the attachment mechanisms 160 and 170 may not be necessary for attaching the shaft 120 with the tip 110. In various embodiments, the attachment mechanisms 160 and 170 both include screw threads, with the attachment mechanism 160 having screw threads configured to match the screw threads of the attachment mechanism 170. Interlocking the threads of attachment mechanisms 160 and 170 physically couples the tip 110 to the shaft 120. In other embodiments (not shown), the attachment mechanism 160 involves one ore more properly sized and shaped indentations and the attachment mechanism 170 involves one ore more properly sized and shaped protrusions, and attachment mechanisms 160 and 170 together form one or more press or other fits. In some embodiments, adhesive is used to help couple attachment mechanisms 160 and 170 to each other physically. In various embodiments, the attachment mechanisms 160 and 170 can use any mechanism that may fasten and/or ensure a sufficient electrical contact between the tip 110 and the shaft 120. Various attachment mechanisms are further discussed herein and in FIG. 6.

In various embodiments with stylus tips shaped to produce circular or elliptical footprints, when the stylus 100 is used on a solid flat surface, such as the face-sheet of a touch sensor, it forms a footprint on the surface that is either oval or circular depending on the angle at which the stylus 100 is held.

Figure 2:
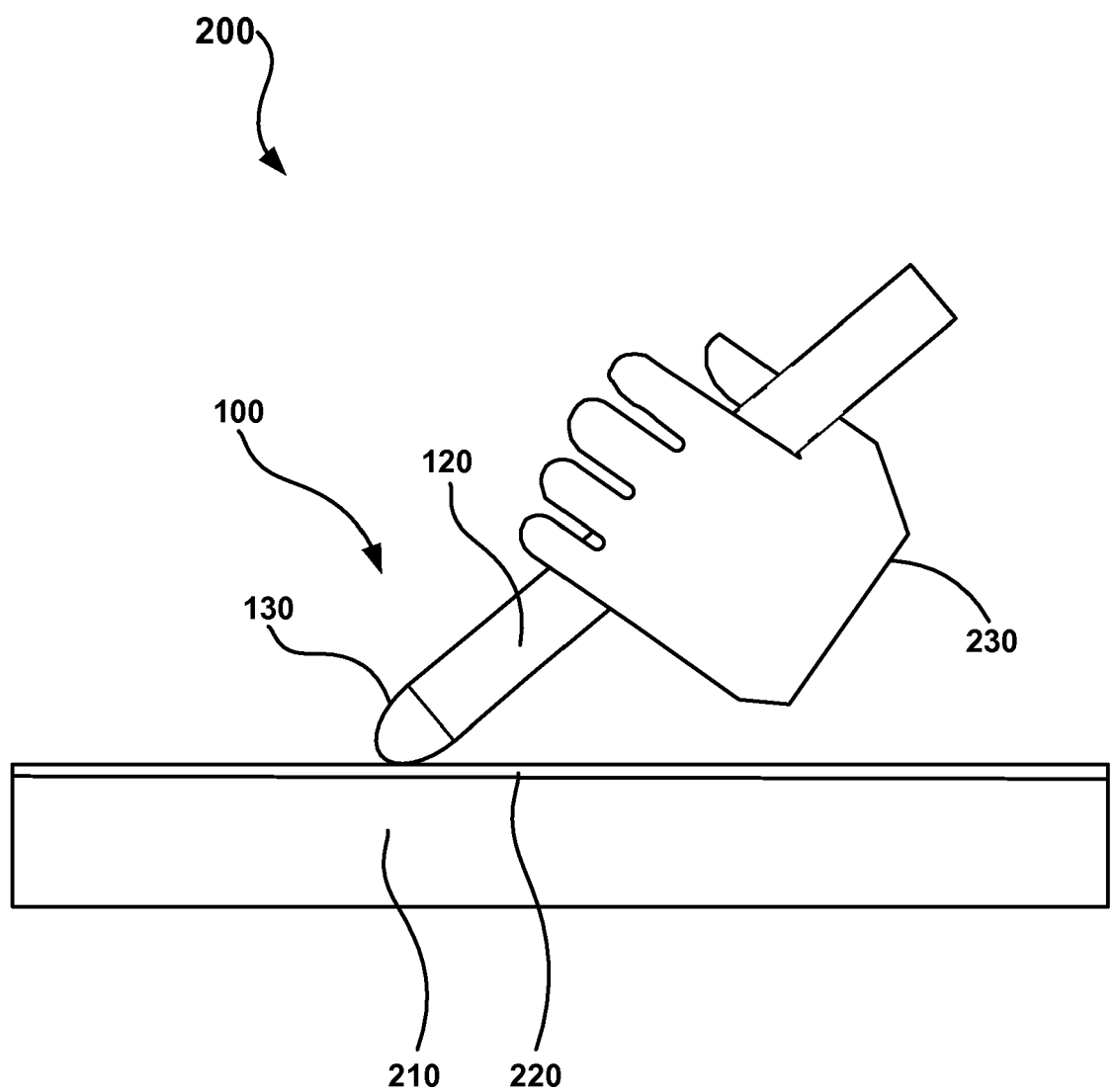
FIG. 2 illustrates a view of a stylus and a capacitive sensing device, in accordance with an embodiment of the present technology.

FIG. 2 illustrates a view 200 of a stylus and a capacitive sensing device, in accordance with an embodiment of the present technology. The view 200 comprises the stylus 100, a capacitive sensing device 210, and a user 230. The capacitive sensing device 210 is configured to sense input on device surface 220, which may be a part of capacitive sensing device 210 or a part of a different device.

The stylus 100 is configured to electrically couple the capacitive sensing device 210 and the user 230. Thus, in various embodiments, the portions of shaft 120 configured to contact the user 230 during use are made conductive. In other embodiments, the entire shaft 120 is made of conductive material. In various embodiments, the device surface 220 is made using a semi-conductive material that helps magnify the footprint of the stylus 100 to the capacitive sensing device 210. In other embodiments, the device surface 220 is insulative, and designed not to couple ohmically with the capacitive sensing device 210 or the stylus 100.

In various embodiments, the flexible region 140 (not depicted) is conductive, and comprises the contact surface 130. In such embodiments, contact surface 130 is a surface of a conductive flexible region 140, and this design allows electrical coupling between the capacitive sensing device 210 and the user 230 via both the contact surface 130 and the flexible region 140 (which are parts of the same component). Some or all of the intermediate components between the tip 110 and the shaft 120 are made conductive, such that there is an electrical path between the flexible region 140 and the user 230 during use.

In other embodiments, the tip 110 comprises a contact surface that is the surface of a conductive contact component (not depicted) separate from the flexible region 140. This allows electrical coupling between the capacitive sensing device 210 and the user 230 via the contact component. Some or all of the intermediate components between the tip 110 and the shaft 120 are made conductive, such that there is an electrical path between the contact component and the user 230 during use. The contact component may be made of a pliable material such as thin elastomeric or plastic material embedded with conductive material, a conductive fabric containing conductive wires, and/or any other pliable conductive material.

Thus, the contact surface 130 may be a surface of a component made of a conductive material, as discussed above and below. Alternatively, contact surface 130 may be a surface of a non-conductive material, as discussed below.

In other embodiments, the flexible region 140 may be made of a conductive material, and the contact surface 130 may be a surface of a non-conductive component. The non-conductive component having contact surface 130 is made sufficiently thin to allow adequate electrical coupling between the capacitive sensing device 210 and the user 230 via the flexible region 140. Some or all of the intermediate components between the tip 110 and the shaft 120 are made conductive, such that there is an electrical path between the flexible region 140 and the user 230 during use. In these embodiments, electrical coupling between the user 230 and the capacitive sensing device 210 may be obtained without direct physical contact of a conductive component to device surface 220.

In still further embodiments, the flexible region 140 may be made of a conductive material, and the contact surface 130 may be a surface of a separate, conductive component. The conductive component having contact surface 130 works with flexible region 140 to allow adequate electrical coupling between the capacitive sensing device 210 and the user 230 during use. Some or all of the intermediate components between the tip 110 and the shaft 120 are made conductive, such that there is an electrical path between the flexible region 140 and the user 230 during use.

The device surface 220 may be a protective covering of the capacitive sensing device 210, a cover lens of an electronic system hosting the capacitive sensing device 210, a housing containing the capacitive sensing device 210, or some other surface associated with the capacitive sensing device 210. Further, the capacitive sensing device 210 and device surface 220 can be opaque, translucent or clear.

Figure 3:
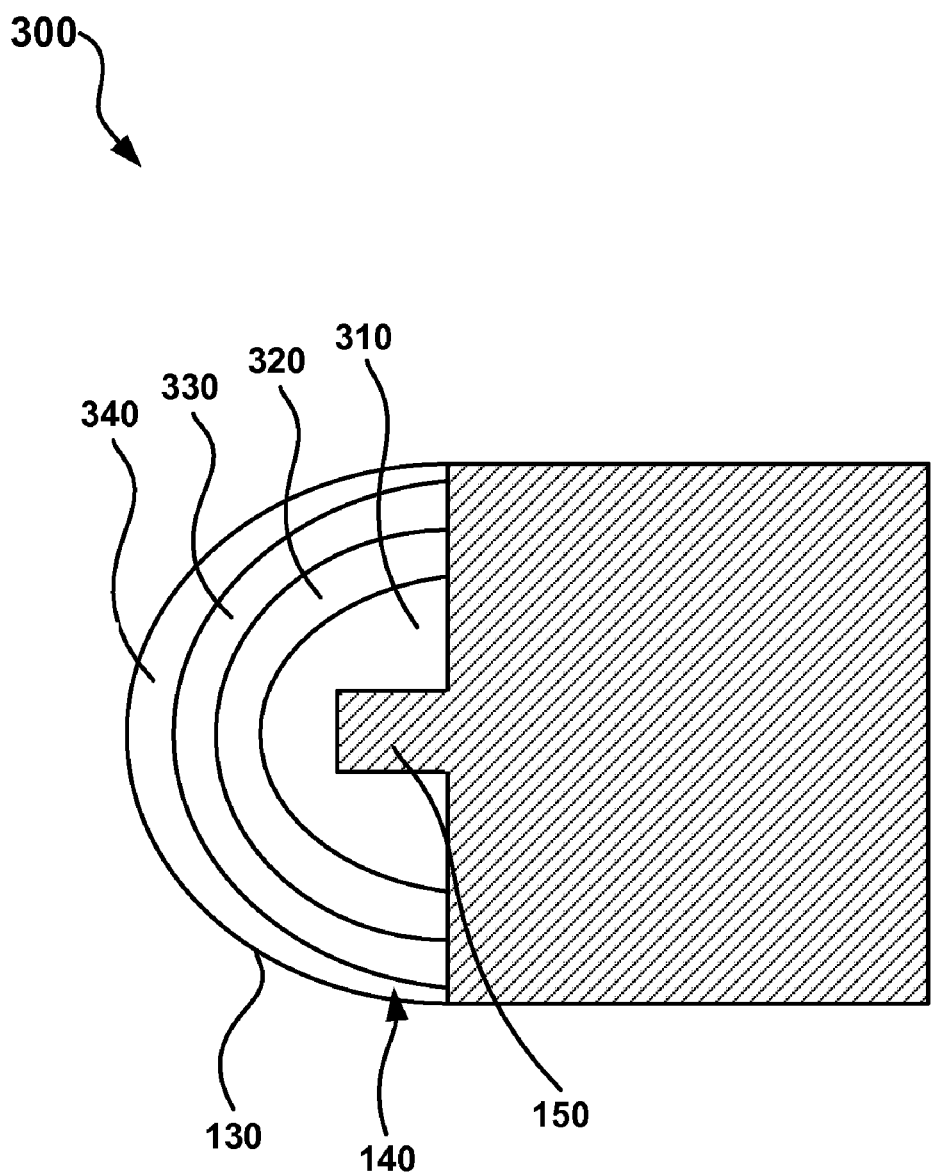
FIG. 3 illustrates a cross-sectional view of a stylus tip with multiple layers, in accordance with an embodiment of the present technology.

FIG. 3 illustrates a cross-sectional view of a tip 300 with multiple layers, in accordance with an embodiment of the present technology. Although four layers are shown, it is understood that any number of layers can be used in various embodiments. Thus, the flexible region 140 may comprise two or more layers, such as layers 310, 320, 330 and 340. Each of the layers 310-340 may have a same or different hardness compared to its neighbors, and all of the layers 310-340 can have different hardness compared to each other. Different hardness may be obtained by using one or more different materials, compositions, and/or manufacturing processes. Each of the layers 310-340 may also have analogous or different physical designs, including all of the layers 310-340 having different thicknesses and/or different shapes compared to each other. In various embodiments some or all of the layers 310-340 may have conductive properties.

The flexible region 140 is designed to have a hardness gradient. In some embodiments, the hardness gradient decreases uniformly from the support region 150 to the contact surface 130. In other embodiments, the hardness gradient varies non-uniformly from the support region 150 to the contact surface 130. The hardness gradient may also be overall decreasing from the support region 150 to the contact surface 130. In various embodiments, the hardness gradient is produced using layers with different compositions and/or manufacturing processes. In other embodiments, concentrations of two or more materials with different hardnesses or other appropriate material characteristics are changed to produce an overall hardness gradient.

In other embodiments, the hardness gradient has an overall decreasing hardness, wherein a hardness of a layer near the support region 150, such as layer 310, is higher than a hardness of a layer near the contact surface 130, such as layer 340. The overall decreasing hardness is further discussed herein and in FIG. 6.

Figure 4:
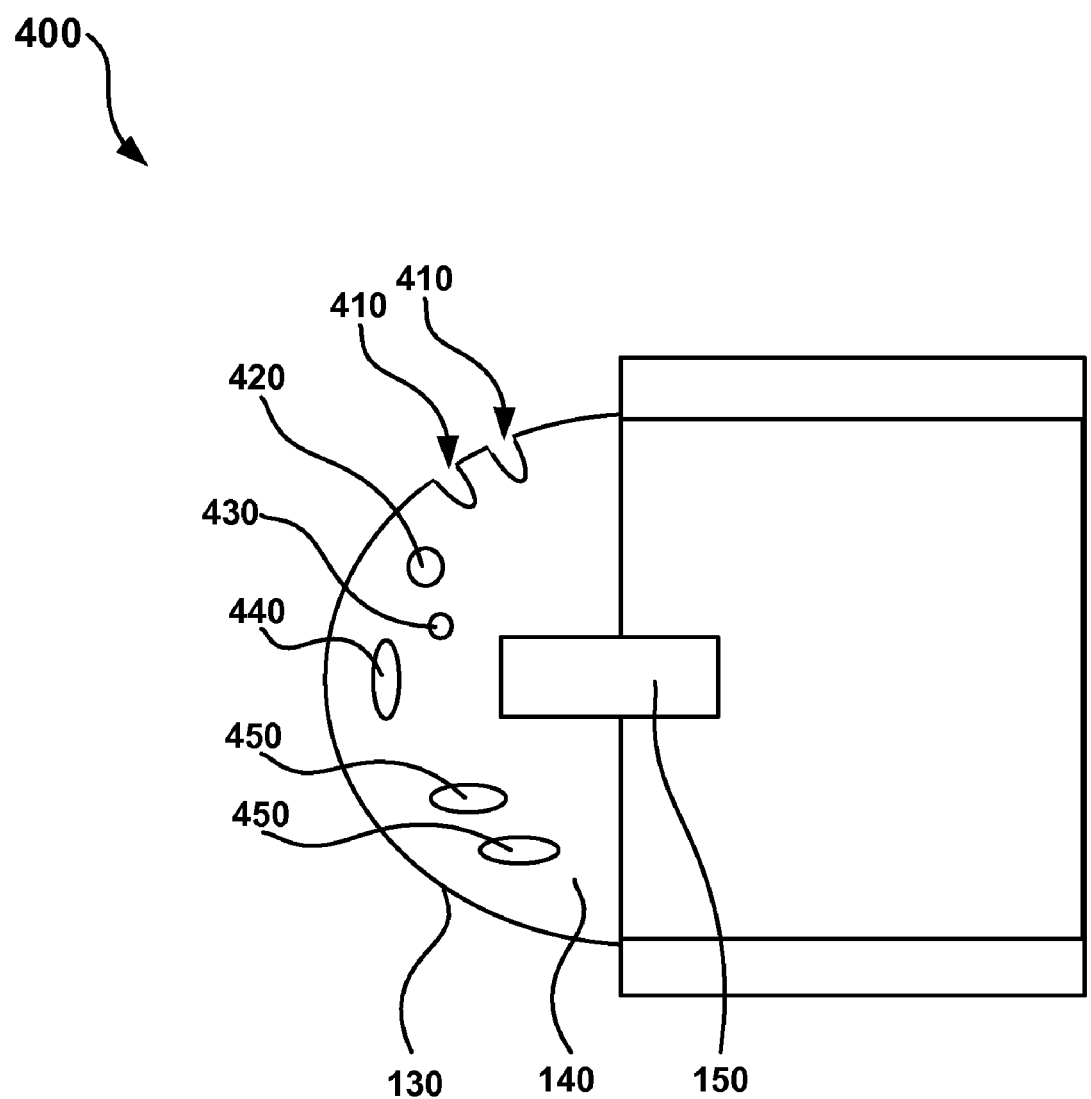
FIG. 4 illustrates a cross-sectional view of a stylus tip with gaseous regions, in accordance with an embodiment of the present technology.

FIG. 4 illustrates a cross-sectional view of a tip 400 with gaseous regions, in accordance with an embodiment of the present technology. The flexible region 140 may include a gaseous material, such as gaseous materials 410, 420, 430, 440 and 450, and a gas containing material, such as a balance of the flexible region 140. The gaseous material 410-450 may be any gas, such as air, oxygen, nitrogen, carbon dioxide, and/or any other gas that may be included in the flexible region 140, and the gaseous materials 410-450 may all be the same gas or different gases. In some embodiments, the gaseous material is embedded in flexible region 140 (akin to closed cells in material science), such as gaseous material 420-450. In other embodiments, the gaseous material is included in open features connecting to the outside of flexible region 140 (akin to open cells in material science), such as gaseous material 410.

The gaseous materials 410-450 may have different shapes, directions, sizes, and/or densities, so as to produce an overall hardness gradient. Different shapes, directions, sizes and/or densities may be produced by controlling injections procedures, centrifugal forces, and/or manufacturing procedures.

In other embodiments, the gaseous materials 410-450 may be liquids. In still other embodiments, the gaseous materials 410-450 may be solids with higher and/or lower hardness so as to produce a desired overall hardness gradient.

In various embodiments, an overall hardness gradient is produced using gaseous materials that have different shapes, directions, sizes and/or densities. For example, an area near the support region 150 may have fewer gaseous materials than an area near the contact surface 130, thereby producing a lower hardness near the contact surface 130 than the hardness near the support region 150.

Figure 5A:
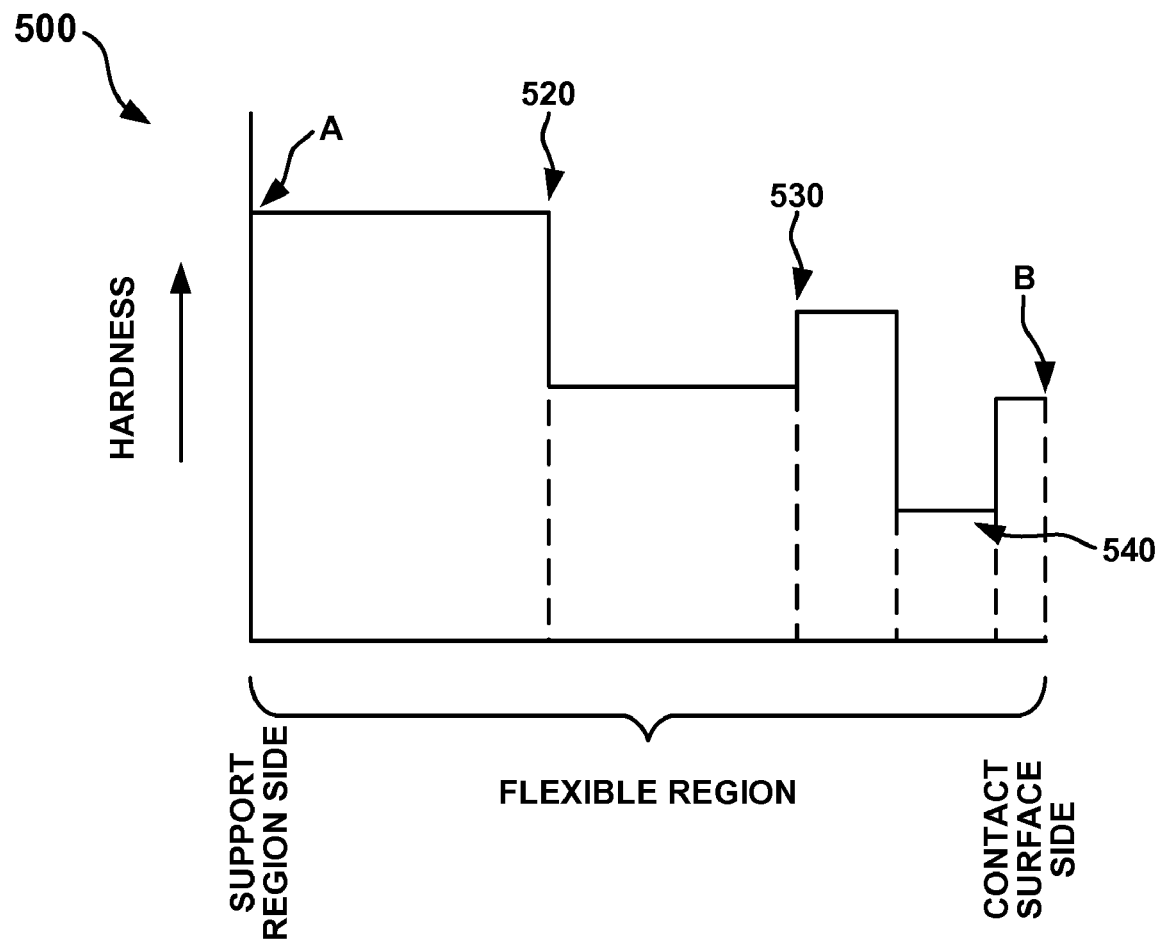
FIGS. 5A and 5B are graphs that illustrate an overall decreasing hardness, in accordance with embodiments of the present technology.
Figure 5B:
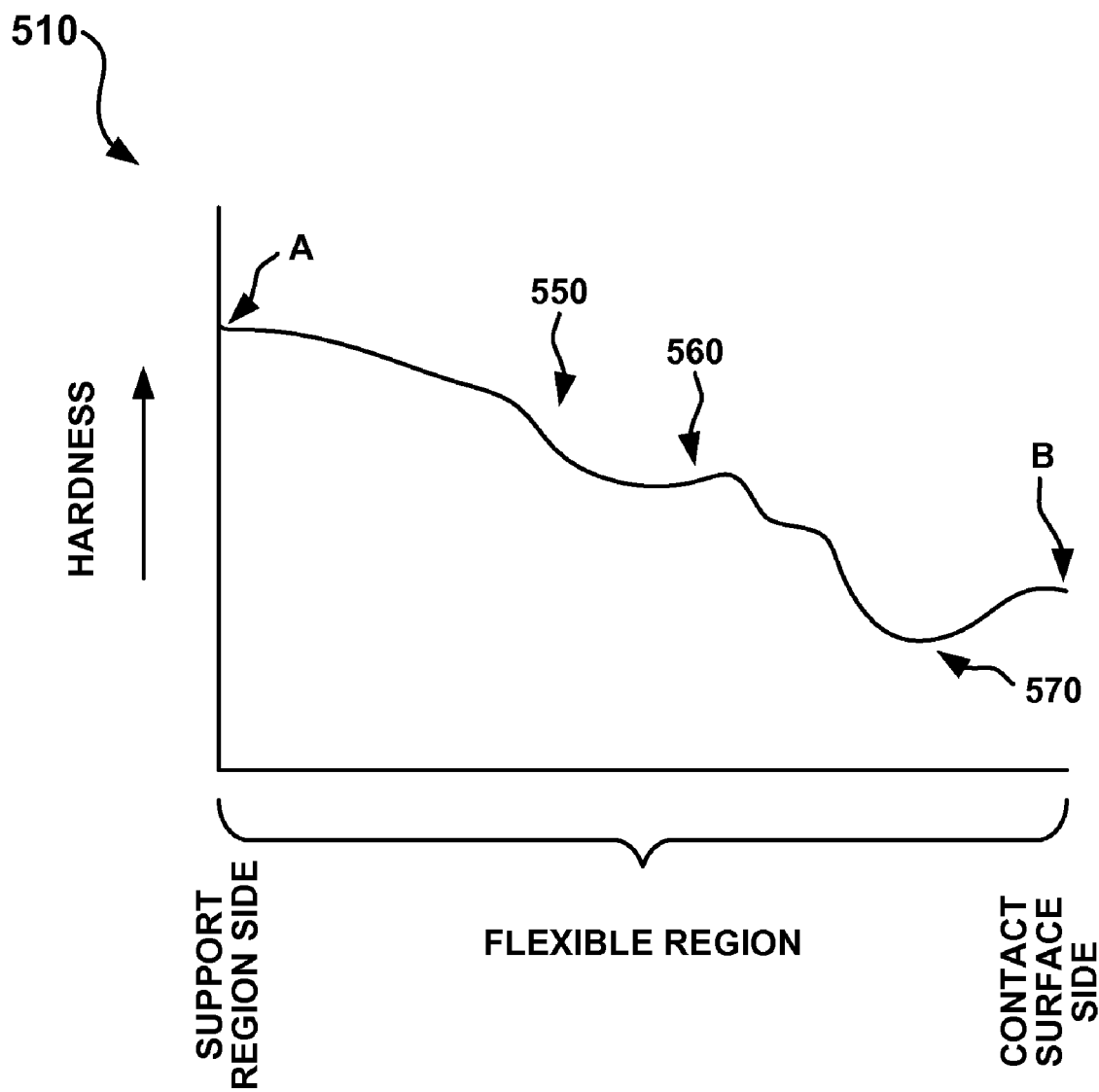

FIGS. 5A and 5B are graphs 500-510 that illustrate an overall decreasing hardness, in accordance with two embodiments of the present technology. The graph 500 illustrates an overall decreasing hardness for a tip with a flexible region with uniform layers, such as the tip 300 in FIG. 3. The graph 510 illustrates an overall decreasing hardness for a tip with a flexible region with gaseous materials, such as the tip 400 in FIG. 4. Note that although two specific hardness graphs are shown, any variety of hardness variations are possible, including any combination of higher or lower hardness in discrete steps of variation or with continuous variation. Both graphs 500 and 510 indicate embodiments of the present technology that comprise material with a higher hardness, such as hardness A, nearer the support region 150 than a material with a lower hardness, such as hardness B, nearer to the contact surface 130. Thus, the hardness gradient of the flexible regions depicted by graphs 500 and 510 has an overall decreasing hardness in a direction from the support region 150 to the contact surface 130. The hardness of a material may be measured and/or determined using the composite material at a distance from the support region 150. So, for example, a material comprising a non-gaseous material would have a higher hardness than a material comprising the same non-gaseous material and a gaseous material.

The graph 500 shows an overall decreasing hardness with steps of different hardnesses, represented by different layers. The different layers may be distinguished by the dashed lines. As shown, there are five different layers. As the hardness of materials may differ from layer to layer, a hardness curve may be represented using a step function. A hardness may decreases from layer to layer, such as indicated by the step 520. Similarly, a hardness may increase from layer to layer, such as an increase indicated by the hardness 530. The increase of hardness from layer to layer may not neutralize the decreasing overall hardness gradient as long as the hardness B is lower than the hardness A.

In some embodiments, one or more layers between the layers nearest to the support region 150 and the contact surface 130 have materials with a lower hardness, as indicated by a layer with a material of a hardness 540.

The graph 510 shows an overall decreasing hardness with a continuously varying curve, the changes of overall hardness influenced by gaseous materials. As properties, such as density, of the gaseous materials change, the curve may decrease (as indicated by decrease 550) and/or increase (as indicated by increase 560). An increase of hardness may not neutralize the decreasing overall hardness gradient as long as the hardness B is lower than the hardness A. In some embodiments, one or more regions between the support region 150 and the contact surface 130 may have a lower hardness than a hardness of a material closer to the contact surface 130, as indicated by a hardness 570. It is understood that although graphs 510 and 500 show graphs that have increasing and decreasing hardness in portions, that other embodiments may have monotonically decreasing hardness gradient. The increase or decrease can also be made to follow particular linear or non-linear rates of increase or decrease.

In some embodiments, a layer of the flexible region 140 closest to the contact surface 130 have a material with a lower hardness than a material used in the contact surface 130.

Figure 6:
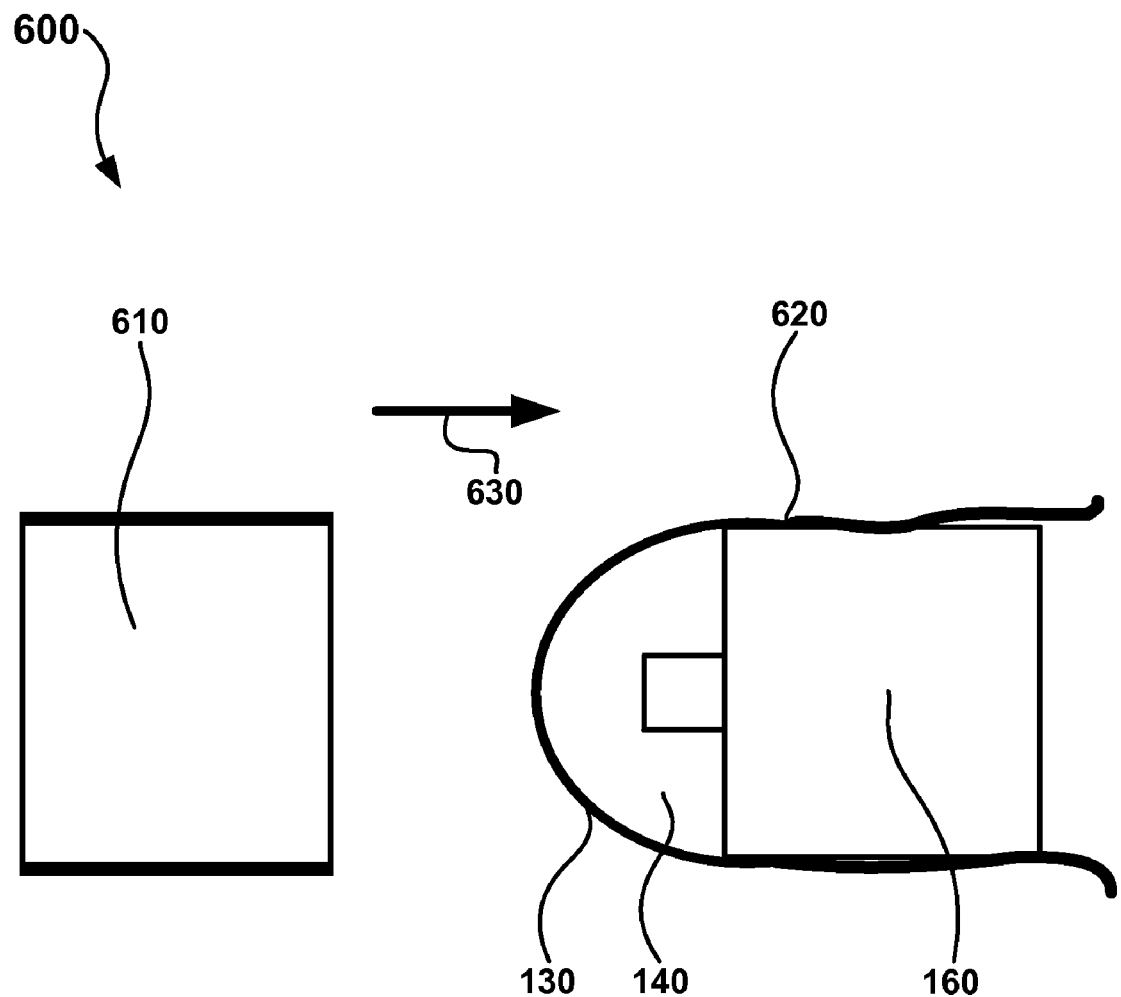
FIG. 6 illustrates a cross-sectional view of a stylus tip and a coupling, in accordance with an embodiment of the present technology.
Figure 7A:
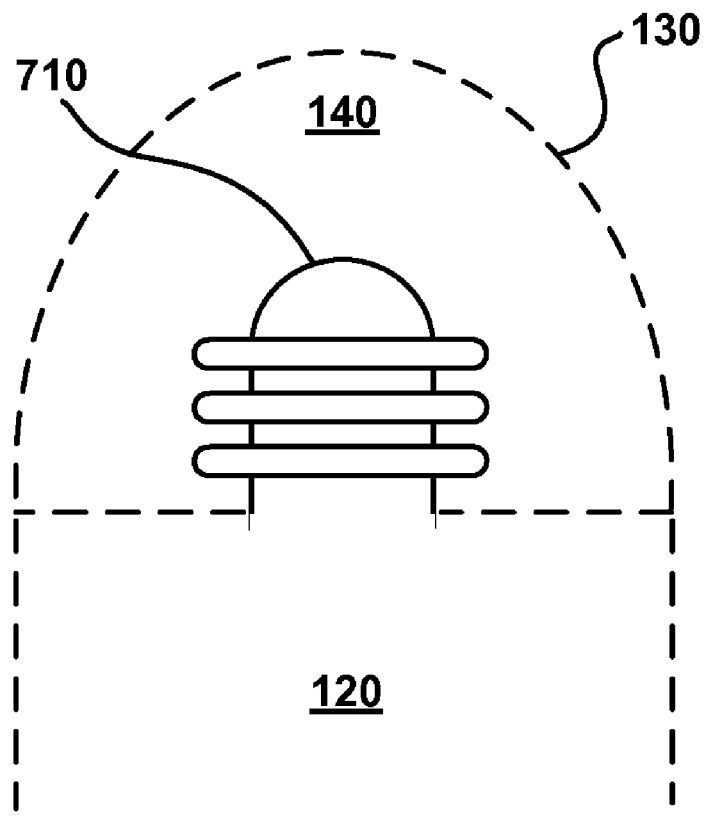
FIGS. 7A-7D illustrate support regions, in accordance with an embodiment of the present technology.
Figure 7B:
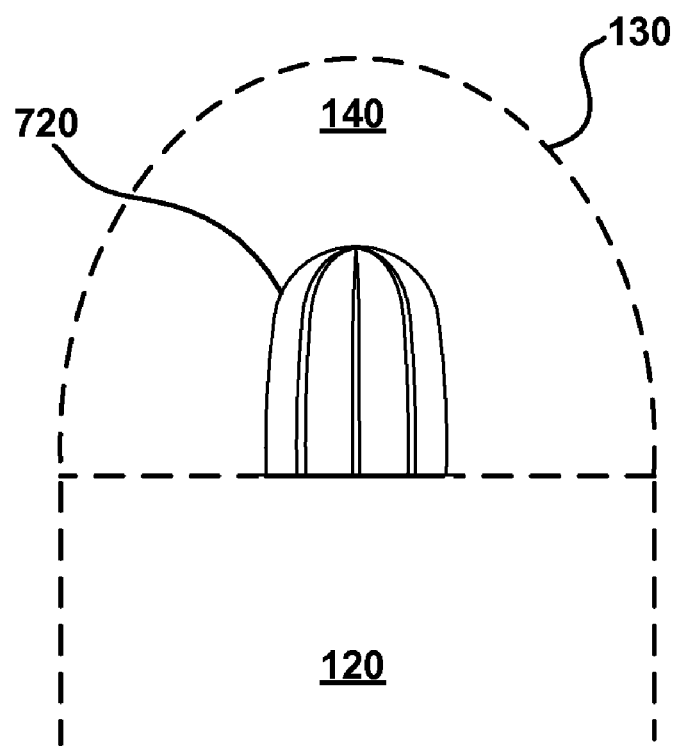
Figure 7C:
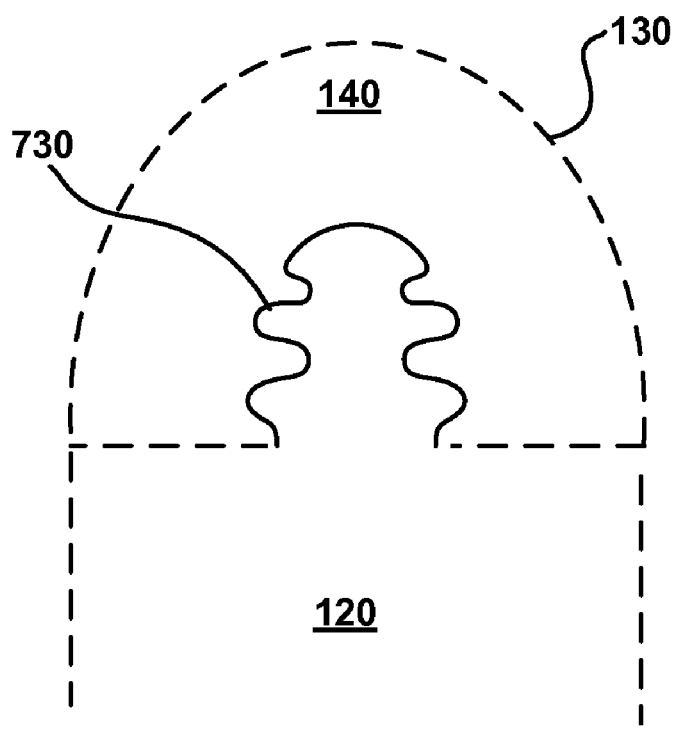
Figure 7D:
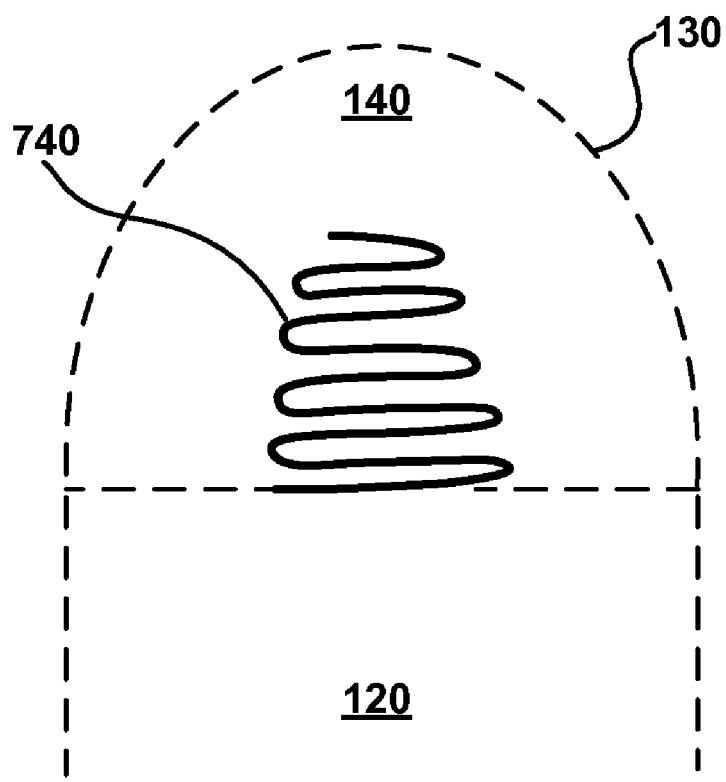

FIG. 6 illustrates a cross-sectional view 600 of a tip and a coupling, in accordance with an embodiment of the present technology. The tip may be the tip 110. The tip is configured to couple with a coupling device 610. The contact surface 130 comprises an extended surface 620. The coupling device 610 may be configured to couple the component containing contact surface 130 physically with the flexible region 140 and electrically with the attachment mechanism 160. During assembly, the coupling device 610 is positioned around the tip, as indicated by arrow 630. In other embodiments, adhesives are used to physically couple the contact surface 130 and the flexible region 140 with or without use of the coupling device 610.

FIGS. 7A-7D illustrate support regions 710-740, in accordance with an embodiment of the present technology. The support region 150 may have a complex shape. For example, the support region may have extensions, such as the support region 710, fins, such as the support region 720, crests and valleys, such as the support region 730, a coiled spring, such as the support region 740, or any other shape to provide an appropriate support. In various embodiments, the support region 150 provides sufficient support in the flexible region 140 to alleviate a need for a hardness gradient in the flexible region 140. Thus, in some embodiments, the flexible region 140 does not have a hardness gradient.

Figure 8:
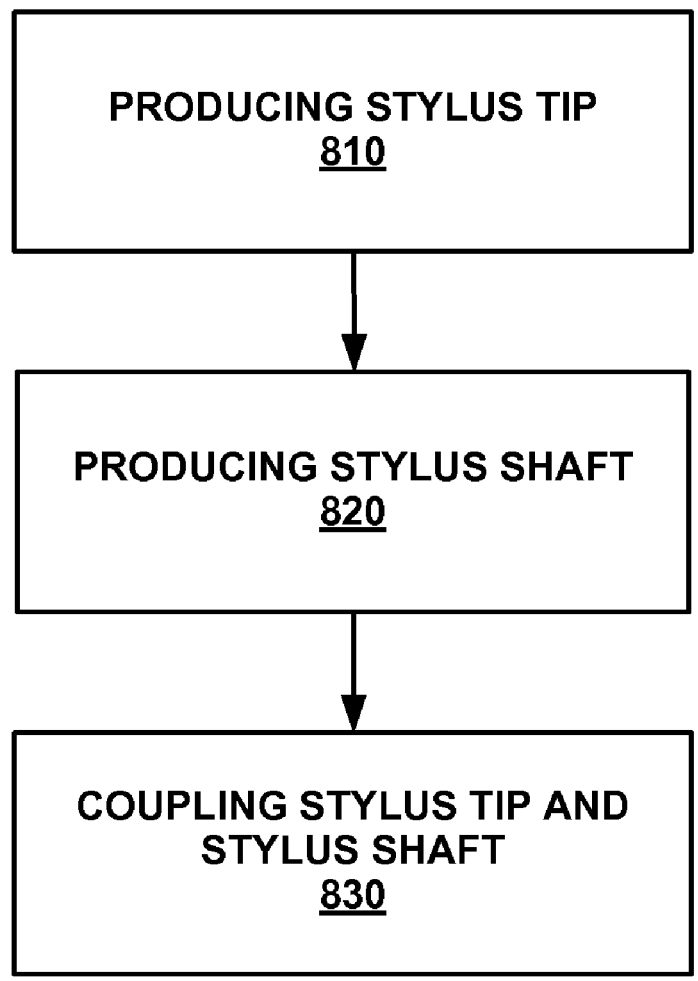
FIG. 8 is a flow diagram of an example method of manufacturing a stylus, in accordance with an embodiment of the present technology.

FIG. 8 is a flow diagram of an example method of manufacturing a stylus, in accordance with an embodiment of the present technology. In step 810, the tip 110 is produced. The tip is produced with the flexible region 140 having a hardness gradient. One approach to producing the tip 110 is to use two hemispherical shaped molds. The molds may be made using a machinable or otherwise malleable material, including aluminum or Delrin, or any other mold material.

In step 820, the shaft 120 is produced. In step 830, the tip 110 and the shaft 120 are coupled. In various embodiments, the shaft 120 is produced separately from the tip 110.

While the embodiments illustrated in steps 810-830 show specific sequences and quantity of steps, alternative embodiments are possible. For example, not all the steps provided for in the methods are required. Furthermore, additional steps may be added to the steps presented in the present embodiment. Likewise, the sequences of steps can be modified depending upon the application.

The foregoing descriptions of example embodiments have been presented for purposes of illustration and description. They are not intended to be exhaustive or to limit the teaching to the precise forms disclosed. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A conductive stylus tip configured to couple electrically with a capacitive sensing device and to couple physically and electrically with a stylus shaft, said stylus shaft configured to be held by a user, said conductive stylus tip comprising:

a contact surface configured to contact a device surface associated with said capacitive sensing device;

a support region; and a flexible region disposed between said contact surface and said support region, said flexible region comprising a hardness gradient, wherein said support region is configured to provide structural support to said flexible region.

2. The stylus tip of claim 1, wherein said hardness gradient has an overall decreasing hardness in a direction from said support region to said contact surface.

3. The stylus tip of claim 1, wherein said flexible region comprises said contact surface.

4. The stylus tip of claim 1, wherein said contact surface, said flexible region, and said support region each comprises a physically separate component.

5. The stylus tip of claim 1, further comprising a contact component separate from said flexible region, wherein said contact component comprises said contact surface.

6. The stylus tip of claim 5, wherein said contact component comprises a conductive fabric.

7. The stylus tip of claim 1, wherein said contact surface comprises a surface of a conductive component.

8. The stylus tip of claim 1, wherein said flexible region comprises a conductive material.

9. The stylus tip of claim 8, wherein said contact surface comprises a surface of a non-conductive component.

10. The stylus tip of claim 1, wherein said flexible region comprises a first material and a second material, wherein said second material has a lower hardness than said first material.

11. The stylus tip of claim 1, wherein said flexible region comprises a gaseous material and a gas containing material.

12. The stylus tip of claim 1, wherein said flexible region comprises a plurality of layers, wherein at least two of said plurality of layers have differing hardness.

13. The stylus tip of claim 1, further comprising a coupling device configured to couple said contact surface physically with said flexible region.

14. A conductive stylus comprising:

a stylus tip configured to couple electrically with a capacitive sensing device, said stylus tip comprising a contact surface configured to contact a device surface associated with said capacitive sensing device, a conductive material configured to couple electrically with said capacitive sensing device, a support region, and a flexible region disposed between said contact surface and said support region, said flexible region comprising a hardness gradient, wherein said support region is configured to provide structural support to said flexible region; and a stylus shaft configured to couple physically with said stylus tip, to couple electrically with said conductive material, to provide electrical coupling between said stylus tip and a user, and to be held by a user.

15. The conductive stylus of claim 14, wherein said hardness gradient has an overall decreasing hardness in a direction from said support region to said contact surface.

16. The conductive stylus of claim 14, wherein said flexible region comprises a first material and a second material, wherein said second material has a lower hardness than said first material.

17. The conductive stylus of claim 14, wherein said flexible region comprises a plurality of layers, wherein at least two of said plurality of layers have differing hardness.

18. A writing device configured to enable electrical coupling between a capacitive sensing device and a user, said writing device comprising:

a pliable contact surface configured to provide reduced sliding friction when said writing device is used to write on a device surface associated with said capacitive sensing device;

a longitudinal support; and a cushioning member disposed between said pliable contact surface and said longitudinal support, wherein said longitudinal support is configured to provide structural support to said cushioning member, and wherein said longitudinal support is configured to reduce lateral deformation of said cushioning member responsive to a force exerted on said surface of said capacitive sensing device with said writing device.

19. The writing device of claim 18, wherein said cushioning member comprises a hardness gradient.

20. The writing device of claim 19, wherein said hardness gradient has an overall decreasing hardness in a direction from said longitudinal support to said pliable contact surface.

21. The writing device of claim 18, further comprising a contact component separate from said cushioning member, wherein said contact component comprises said pliable contact surface.

22. The writing device of claim 21, wherein said contact component comprises a conductive fabric.

23. The writing device of claim 18, further comprising a shaft, wherein said writing device is configured to enable electrical coupling between said capacitive sensing device and said user by enabling electrical coupling between said pliable contact surface and said user via said shaft.

24. The writing device of claim 18, further comprising a shaft, wherein said writing device is configured to enable electrical coupling between said capacitive sensing device and said user by enabling electrical coupling between said cushioning member and said user via said shaft.

25. A method of manufacturing a writing device comprising:

producing a stylus tip configured to couple electrically with a capacitive sensing device, said stylus tip comprising a contact surface configured to contact a device surface associated with said capacitive sensing device, a conductive material configured to couple electrically with said capacitive sensing device, a support region, and a flexible region disposed between said contact surface and said support region, said flexible region comprising a hardness gradient, wherein said support region is configured to provide structural support to said flexible region;

producing a stylus shaft configured to couple physically with said stylus tip, to couple electrically with said conductive material, to provide electrical coupling between said stylus tip and a user; and coupling said stylus tip and said stylus shaft.

* * * * *